(12) United States Patent
Moon et al.

(10) Patent No.: US 10,553,877 B2
(45) Date of Patent: Feb. 4, 2020

(54) ELECTROCHEMICAL CATALYST STRUCTURE AND METHOD OF FABRICATING THE SAME

(71) Applicant: UNIVERSITY-INDUSTRY FOUNDATION(UIF), YONSEI UNIVERSITY, Seoul (KR)

(72) Inventors: Joo Ho Moon, Seoul (KR); Dae Hee Lee, Seoul (KR); Jai Wan Tan, Seoul (KR)

(73) Assignee: UNIVERSITY-INDUSTRY FOUNDATION(UIF), YONSEI UNIVERSITY, Seoul (KR)

(*) Notice: Subject to any disclaimer, the term of this patent is extended or adjusted under 35 U.S.C. 154(b) by 201 days.

(21) Appl. No.: 15/637,284

(22) Filed: Jun. 29, 2017

(65) Prior Publication Data

US 2018/0006311 A1    Jan. 4, 2018

(30) Foreign Application Priority Data

Jun. 30, 2016 (KR) .................. 10-2016-0082884

(51) Int. Cl.
*H01M 4/90* (2006.01)
*C01F 17/00* (2006.01)
*C01G 51/00* (2006.01)

(52) U.S. Cl.
CPC ....... *H01M 4/9033* (2013.01); *C01F 17/0043* (2013.01); *C01G 51/70* (2013.01); *C01P 2002/34* (2013.01)

(58) Field of Classification Search
None
See application file for complete search history.

(56) References Cited

U.S. PATENT DOCUMENTS

| 7,795,170 B2* | 9/2010 | Tanaka ................. B01J 23/002 502/304 |
| 2009/0035633 A1* | 2/2009 | Rule .................. H01M 4/8652 429/496 |
| 2017/0207055 A1* | 7/2017 | Jacobs ................. H01J 19/062 |
| 2018/0093229 A1* | 4/2018 | Yildiz ................ H01M 4/9033 |

FOREIGN PATENT DOCUMENTS

KR       20160042381 A      4/2016

OTHER PUBLICATIONS

Wenzhe Si, et al; "A Facile Method for in Situ Preparation of the $MnO_2/LaMnO_3$ Catalyst for the Removal of Toluene", Environmental Science & Technology, vol. 50, pp. 4572-4578; Published Feb. 17, 2016.
Korean Office Action dated Apr. 25, 2018; Appln. No. 10-2016-0082884.

* cited by examiner

*Primary Examiner* — Rena Dye Cronin

(57) ABSTRACT

The present invention relates to an electrochemical catalyst structure and a method for producing the same. The electrochemical catalyst structure may include a catalyst layer including a perovskite based oxide as an electrochemical oxygen reduction catalyst; and a modifying layer being in contact with the catalyst layer and including a transition metal oxide capable of chemical interaction with a metal of the perovskite based oxide through electron orbital hybridization.

7 Claims, 13 Drawing Sheets

ELECTROCHEMICAL CATALYST STRUCTURE AND METHOD OF FABRICATING THE SAME

CROSS-REFERENCE TO RELATED APPLICATION

This application claims the benefit of Korean Patent Application No. 10-2016-0082884, filed on Jun. 30, 2016, in the Korean Intellectual Property Office, the disclosure of which is incorporated herein in its entirety by reference.

BACKGROUND

1. Field

The present invention relates to a catalyst for an oxygen reduction, and more particularly, to an electrochemical catalyst structure and a method for fabricating the same.

2. Description of the Related Art

Generally, a catalyst for an electrochemical oxygen reduction constitutes a reducing electrode in an electrochemical energy conversion device such as a fuel cell, a metal-air battery, and an electrolyzer, and plays an important role as a key factor in determining an efficiency of renewable energy system. A perovskite based oxide is mainly used as a material of the catalyst for oxygen reduction, and improvements in terms of a catalytic performance and a long-term stability requires to commercialize this. The perovskite based oxide has $ABO_3$ (A: rare earth metal, B: transition metal) structure, and a binding property of the transition metal of B site is known as an important factor for determining the catalytic performance and the stability. Accordingly, in order to improve the catalytic performance and the stability of the catalyst for oxygen reduction, there have been studies to control the binding property by doping a different kind of element in the perovskite based oxide. However, in the case of doping the perovskite based oxide with a heteroatom, not only a change of the binding property of the transition metal (B site) but also a change of the lattice structure of the catalyst for oxygen reduction and the binding property of the rare earth metal (A site) or an unexpected point defect may be happened. As a result, there is a problem that the stability as a catalyst is lowered, desired physical properties are not easily obtained, and it is difficult to design a high-performance and high-stability oxide catalyst.

SUMMARY

An object of the present invention is to provide an electrochemical catalyst structure capable of securing high stability and high performance without causing problems such as changes of bonding properties of A site metals or point defects of perovskite based oxides.

Another object of the present invention is to provide a method of fabricating an electrochemical catalyst structure having the above-stated advantages.

Additional aspects will be set forth in part in the description which follows and, in part, will be apparent from the description, or may be learned by practice of the presented embodiments.

According to an aspect of the present invention, an electrochemical catalyst structure may include a catalyst layer including a perovskite based oxide as an electrochemical oxygen reduction catalyst; and a modifying layer being in contact with the catalyst layer and including a transition metal oxide capable of chemical interaction with a metal of the perovskite based oxide through electron orbital hybridization.

In an example, the perovskite based oxide include a lanthanum manganese oxide ($LaMnO_3$), a lanthanum cobalt iron oxide ($LaCo_{1-x}FexO_3$), a barium cobalt iron oxide ($BaCo_{1-x}FexO_3$), a strontium cobalt oxide ($SrCoO_3$), a lanthanum strontium manganese oxide ($LaSrMnO_3$), and a doping oxide thereof.

The transition metal oxide changes d-band structure which is a valence electron orbital of a manganese (Mn) or a cobalt (Co). The transition metal oxide chemically interacts with B site transition metal of the perovskite based oxide through the electron orbital hybridization. The transition metal oxide includes at least one oxide of a scandium (Sc), a titanium (Ti), a vanadium (V), a chromium (Cr), a manganese (Mn), an iron (Fe), a cobalt (Co), a nickel (Ni), a copper (Cu) and a zinc (Zn).

When the transition metal oxide is an oxygen ion conductive material, the modifying layer is disposed between the catalyst layer and an electrolyte layer, and the electrochemical catalyst structure includes a layer structure having the catalyst layer, the electrolyte layer, and the modifying layer between the catalyst layer and the electrolyte layer.

When the transition metal oxide is an oxygen ion non-conductive material, the modifying layer is formed so as to have an opening exposing at least portion of a surface of an electrolyte layer, and the catalyst layer is formed on a surface of the electrolyte layer that is exposed through the opening of the modifying layer. The modifying layer is formed on an electrolyte layer, in a plurality of island shapes.

According to other aspect of the present invention, an electrochemical catalyst structure may include a catalyst particle including a perovskite based oxide as an electrochemical oxygen reduction catalyst; and a modifying particle including a transition metal oxide capable of chemical interaction through electron orbital hybridization with a B-site metal ion of the perovskite-based oxide, wherein the modifying particle forms a core and the catalyst particle forms a shell which is surrounding at least portion of a surface of the core in a core-shell secondary particle structure. The modifying particle is an oxygen ion conductive material. A volume of the modifying particle in a total volume of the modifying particle and the catalyst particle has from 40 vol % to 60 vol %.

According to another aspect of the present invention, an electrochemical catalyst structure may include an electrolyte particle; a catalyst particle including a perovskite based oxide as an electrochemical oxygen reduction catalyst; and a modifying particle being in contact with the catalyst particle and including a transition metal oxide capable of chemical interaction with a B-site metal ion of the perovskite based oxide through electron orbital hybridization, wherein the electrolyte particle forms a core and the catalyst particle and the modifying particle form a shell which is surrounding at least portion of a surface of the core in a core-shell secondary particle structure. The modifying particle is an oxygen ion non-conductive material. The electrolyte particle comprises gadolinium (Gd) doped ceria ($CeO_2$) which is an oxygen ion conductor having a fluorite structure or a stabilized bismuth oxide ($Bi_2O_3$). A molar ratio of the modifying particle in a total molar ratio of the modifying particle and the catalyst particle has from 2 mol % to 15 mol %.

According to another aspect of the present invention, a method of fabricating an electrochemical catalyst structure, may include providing an electrolyte layer; forming a modifying layer on the electrolyte layer, the modifying layer comprising a transition metal oxide capable of chemical interaction with a B-site metal ion of a perovskite based oxide through electron orbital hybridization; and forming a catalyst layer including the perovskite based oxide as an electrochemical oxygen reduction catalyst, on a second main surface opposite to a first main surface of the modifying layer in contact with the electrolyte layer.

According to another aspect of the present invention, a method of fabricating an electrochemical catalyst structure, the method may include providing an electrolyte layer; forming a modifying layer on the electrolyte layer, the modifying layer comprising a transition metal oxide capable of chemical interaction with a B-site metal ion of a perovskite based oxide through electron orbital hybridization, so as to have an opening exposing at least portion of a surface of the electrolyte layer; and forming a catalyst layer comprising the perovskite based oxide as an electrochemical oxygen reduction catalyst on a surface of the electrolyte layer which is exposed through the opening. The modifying layer is formed on the electrolyte layer, in a plurality of island shapes.

According to another aspect of the present invention, a method of fabricating an electrochemical catalyst structure, may include providing a catalytic particle comprising a perovskite based oxide as an electrochemical oxygen reduction catalyst; providing a modifying particle comprising a transition metal oxide capable of chemical interaction through electron orbital hybridization with a B-site metal ion of the perovskite-based oxide; mixing the catalytic particle and the modifying particle; and forming a core-shell secondary particle structure in which the modifying particle forms a core and the catalyst particle forms a shell which is surrounding at least portion of a surface of the core, by sintering a mixture of the catalyst particle and the modifying particle.

According to another aspect of the present invention, a method of fabricating an electrochemical catalyst structure, may include providing an electrolyte particle; providing a catalytic particle comprising a perovskite based oxide as an electrochemical oxygen reduction catalyst; providing a modifying particle comprising a transition metal oxide capable of chemical interaction through electron orbital hybridization with a B-site metal ion of the perovskite based oxide; mixing the electrolyte particle, the catalytic particle, and the modifying particle; and forming a core-shell secondary particle structure in which the electrolyte particle forms a core and the catalyst particle and the modifying particle form a shell which is surrounding at least portion of a surface of the core, by sintering a mixture of the electrolyte particle, the catalytic particle, and the modifying particle.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
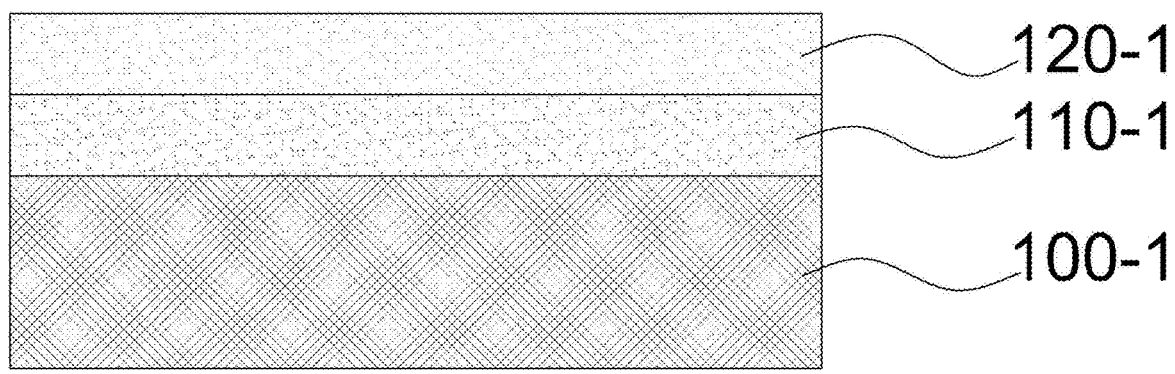
FIG. 1a is a reference drawing of one embodiment for describing an electrochemical catalyst structure according to an embodiment.

The inventive concept will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. Furthermore, a structure or a form shape "adjacent to" other shape may overlap the adjacent shape or be arranged below the adjacent shape.

The relative terms including "below," "above," "upper," "lower," "horizontal," and "vertical" may be used to describe a relationship between an element, a layer, or a region and another element, another layer, or another region as shown in the drawings. It should be understood that the terms are not limited to the orientations shown in the drawings.

FIG. 1A is a reference drawing of one embodiment for describing an electrochemical catalyst structure according to the present invention.

Referring to FIG. 1A, the electrochemical catalyst structure includes an electrolyte layer 100-1, a modifying layer 110-1, and a catalyst layer 120-1. The electrolyte layer 100-1 may include yttria-stabilized zirconia ($xY_2O_3$-$(1-x)ZrO_2$), scandia-stabilized zirconia, ($xSc_2O_3$-$(1-x)ZrO_2$). The electrolyte layer 100-1 may also include doped ceria ($L_xCe_{1-x}O_{2-\delta}$, L=Sm, Gd, Pr, etc.), or stabilized bismuth oxide ($Bi_2O_3$), all of which are oxygen ion conductors having a fluorite structure. However, materials of the electrolyte layer 100-1 is merely illustrative, and may include any material used as an electrolyte necessary for forming a catalyst system.

The modifying layer 110-1 is in contact with the catalyst layer 120-1 and includes a transition metal oxide which can chemically interact with a metal of a perovskite based oxide through electron orbital hybridization. Here, the transition metal oxide includes an oxide of scandium (Sc), titanium (Ti), vanadium (V), chromium (Cr), manganese (Mn), iron (Fe), cobalt (Co), nickel (Ni), copper (Cu), or zinc (Zn) corresponding to a fourth-period transition metal. In addition, these fourth-period transition metals may be further doped in the transition metal oxide.

The transition metal oxide is an oxide of a metal element which can be chemically interacted with B site transition metal ion within the perovskite based oxide, for example, with manganese (Mn) or cobalt (Co) in the perovskite-based oxide described below, through electron orbital hybridization. In particular, the transition metal oxide may include an oxide of a metal element that changes d-band electron structure, which is a valence electron orbital of manganese (Mn) or cobalt (Co) among the transition metals from scandium (Sc) to zinc (Zn), which are a fourth-period transition metal element. Changes of the d-band electron structure can be tested by X-ray absorption spectroscopy (XAS). Specific examples of this will be described later.

When the transition metal oxide is an oxygen ion conductive material, as shown in FIG. 1a, as the modifying layer 110-1 is disposed between the catalyst layer 120-1 and the electrolyte layer 100-1, a layer structure having the electrolyte layer 100-1, the modifying layer 110-1, and a catalyst layer 120-1 may be formed. According to this layer structure, oxygen ions of the catalyst layer 120-1 can be conducted to the electrolyte layer 100-1 through the modifying layer 110-1 having an oxygen ion conductive material. A thickness of the modifying layer 110-1 in the layer structure may be from 100 nm to 300 nm, and a thickness of the catalyst layer 120-1 in the layer structure may be from 20 nm to 200 nm. This thickness is only an example, and the thickness of the modifying layer 110-1 or the catalyst layer 120-1 can be adjusted as needed. For example, as a modifying of the catalyst layer 120-1 corresponds to a surface effect due to a contact between the modifying layer 110-1 and the catalyst layer 120-1 by the modifying layer 110-1, the thickness of the modifying layer 110-1 and/or the catalyst layer 120-1 can be determined within a range in which the surface effect happen, and the oxygen ions of the catalyst layer 120-1 can be easily conducted to the electrolyte layer 100-1 by limiting the thickness.

The catalyst layer 120-1 includes a perovskite based oxide as an electrochemical oxygen reduction catalyst. Here, the perovskite-based oxide may include a lanthanum manganese oxide ($LaMnO_3$), a lanthanum cobalt iron oxide ($LaCo_{1-x}Fe_xO_3$), a barium cobalt iron oxide ($BaCo_{1-x}Fe_xO_3$), a strontium cobalt oxide ($SrCoO_3$). The perovskite-based oxide may also include a doped lanthanum manganese oxide, a doped lanthanum cobalt-iron oxide, a doped barium cobalt-iron oxide, or a doped strontium cobalt oxide, and the like. However, the perovskite-based oxide constituting the catalyst layer 120-1 is not limited to this, and may include any oxide having an $ABO_3$ (A: rare-earth metal, B: transition metal) structure.

Figure 1B:
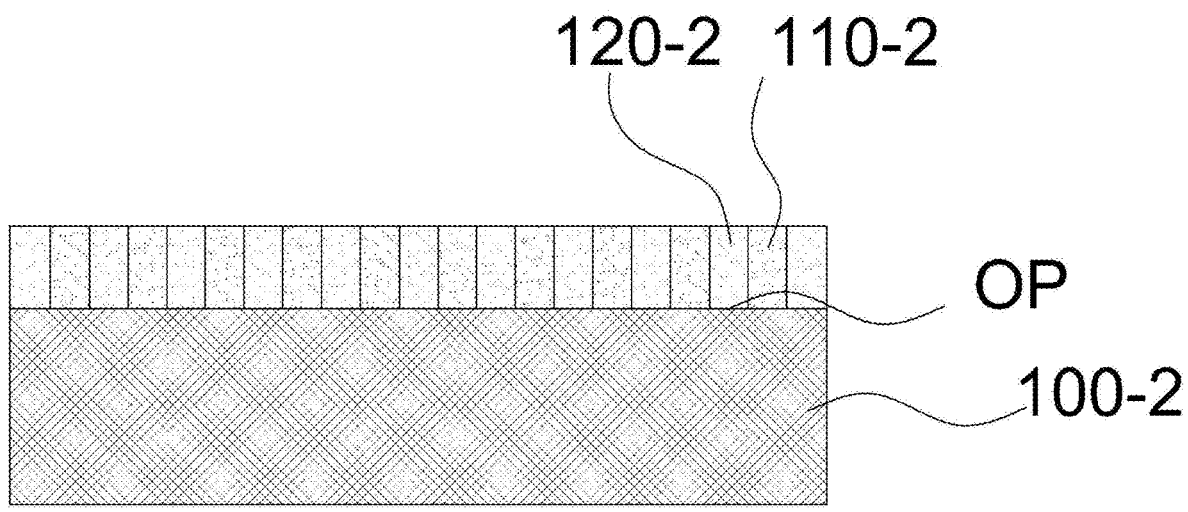
FIG. 1b is a reference drawing of another embodiment for describing an electrochemical catalyst structure according to an embodiment.

FIG. 1b is a reference drawing of another embodiment for describing an electrochemical catalyst structure according to the present invention.

Referring to FIG. 1b, the electrochemical catalyst structure includes an electrolyte layer 100-2, a modifying layer 110-2, and a catalyst layer 120-2. The electrolyte layer 100-2 may be composed of the same or similar material as the electrolyte layer 100-1 shown in FIG. 1a. That is, the electrolyte layer 100-2 may include a yttria stabilized zirconia and scandia-stabilized zirconia, and may also include a doped ceria or stabilized bismuth oxide, all of which are oxygen ion conductors having a fluorite structure.

The modifying layer 110-2 may include a transition metal oxide that can chemically interact with a B site metal ion of a perovskite based oxide through electron orbital hybridization. In particular, the transition metal oxide may include an oxide of a metal element that changes the d-band electron structure, which is a valence electron orbital of manganese (Mn) or cobalt (Co) among the transition metals from scandium (Sc) to zinc (Zn), which are a fourth-period transition metal element.

When the transition metal oxide is an oxygen ion non-conductive material, as shown in FIG. 1b, the modifying layer 110-2 may be formed so as to have an opening OP exposing at least portion of a surface of the electrolyte layer 100-2. Since the transition metal oxide in the modifying layer 110-2 corresponds to an oxygen ion-non-conductive material, oxygen ions in the catalyst layer 120-2 cannot pass through the modifying layer 110-2. Therefore, in order to allow the oxygen ions in the catalyst layer 120-2 to be conducted to the electrolyte layer 100-2, the modifying layer 110-2 coated on the electrolyte layer 100-2 is patterned to form the opening OP exposing at least portion of a surface of an electrolyte layer 100-2.

The modifying layer 110-2 may be formed in a plurality of island shapes on the electrolyte layer 100-2 so as to form an opening OP exposing at least portion of a surface of the electrolyte layer 100-2, or may be patterned such that at least one opening OP is formed in a state where the modifying layer 110-2 is coated on the entire surface of the electrolyte layer 100-2. However, the pattern shape in which the modifying layer 110-2 forms at least one opening OP on the electrolyte layer 100-2 is not limited to this, and a variety of patterns for forming at least one opening OP can be applied. Then, a cross-sectional area of the island-shaped modifying layer 110-2 may be from 1000 nm$^2$ to 10000 nm$^2$, and a height of the modifying layer 110-2 may be from 20 nm to 50 nm. However, the thickness or the height of the island-shaped modifying layer 110-2 may be adjusted and need not to be regularly patterned as needed.

The catalyst layer 120-2 may be composed of the same or similar material as the catalyst layer 120-2 of FIG. 1a. That is, the catalyst layer 120-2 includes the above-mentioned perovskite based oxide as an electrochemical oxygen reduction catalyst.

The catalyst layer 120-2 may be formed on a surface of the electrolyte layer 100-2 exposed through the opening OP. Oxygen ions in the catalyst layer 120-2 cannot pass through the modifying layer 110-2, because the transition metal oxide of the modifying layer 110-2 corresponds to an oxygen ion-non-conductive material. However, since the catalyst layer 120-2 is formed on the surface of the electrolyte layer 100-2 exposed through the opening OP, an oxygen ion conduction path of the catalyst layer 120-2 and the electrolyte layer 100-2 may be provided. Therefore, the oxygen ions in the catalyst layer 120-2 can be directly conducted to the electrolyte layer 100-2.

Figure 2:
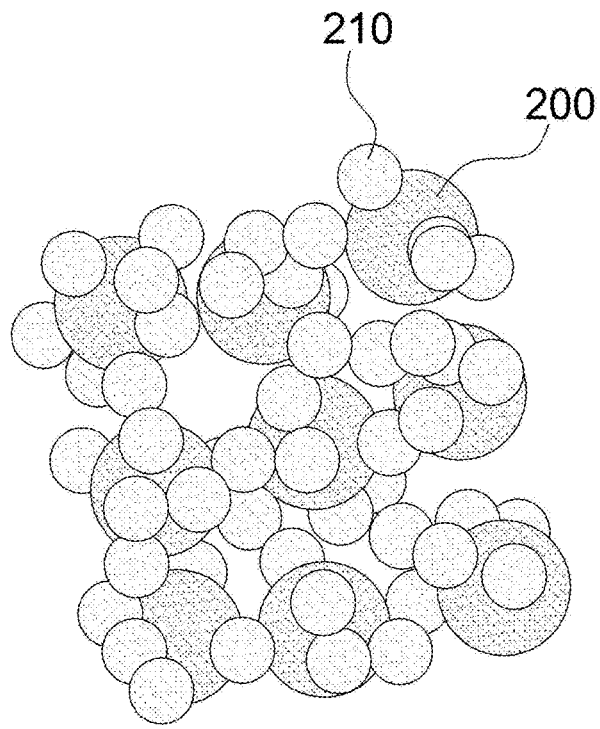
FIG. 2 is a reference drawing of still another embodiment for describing an electrochemical catalyst structure according to an embodiment.

FIG. 2 is a reference drawing of still another embodiment for explaining an electrochemical catalyst structure according to the present invention.

Referring to FIG. 2, the electrochemical catalyst structure includes modifying particles 200 and catalyst particles 210. The modifying particles 200 include a transition metal oxide that can chemically interact with a metal of a perovskite-based oxide through electron orbital hybridization. A material constituting the modifying particles 200 may be the same or similar to that of the modifying layer 110-1 of FIG. 1a described above. Therefore, the transition metal oxide of the modifying particles 200 may be an oxygen ion conductive material.

The catalyst particles 210 include aforementioned perovskite based oxide as an electrochemical oxygen reduction catalyst. A material constituting the catalyst particle 210 may be the same or similar to a material constituting the catalyst layer 120-1 or 120-2 disclosed in FIG. 1a or 1b.

The modifying particles 200 forms a core, and the catalyst particles 210 form a shell which is surrounding at least portion of a surface of the core in a core-shell secondary particle structure. The catalyst particles 210 are bonded to a surface of the modifying particles 200 forming the core, and a plurality of the catalyst particles 210 are bonded to surround the modifying particles 200 so as to form the shell of the modifying particles 200 corresponding to the core. Then, the catalyst particles 210 may surround the entire surface of the modifying particles 200, or may cover only some surface of the modifying particles 200.

The electrochemical catalyst structure of the core-shell secondary particle structure shown in FIG. 2 can be formed by mixing the modifying particles 200 and the catalyst particles 210 and then sintering a mixture to form a powder-based porous structure. In the core-shell secondary particle structure, a volume occupied by the modifying particles 200 in a total volume of the modifying particles 200 and the catalyst particles 210 may be from 40 vol % to 60 vol %. However, the volume of the modifying particles 200 in the total volume of the modifying particles 200 and the catalyst particles 210 can be selectively adjusted.

Figure 3:
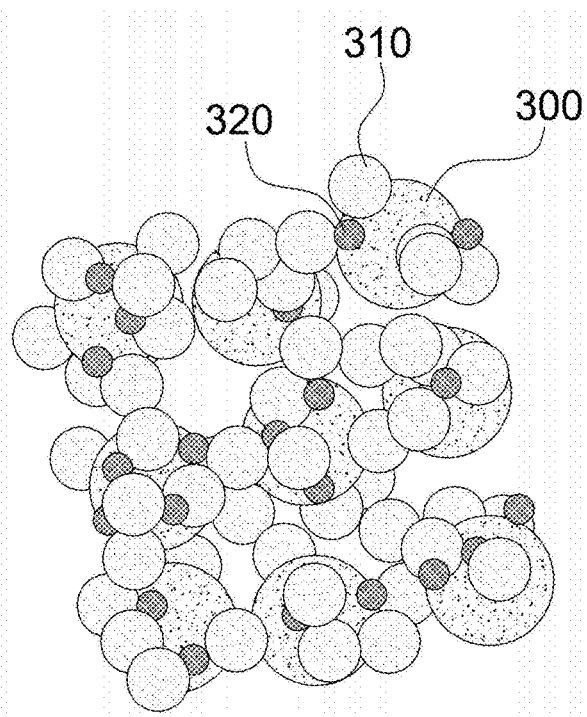
FIG. 3 is a reference drawing of still another embodiment for describing an electrochemical catalyst structure according to an embodiment.

FIG. 3 is a reference drawing of still another embodiment for explaining an electrochemical catalyst structure according to the present invention.

Referring to FIG. 3, the electrochemical catalyst structure includes electrolyte particles 300, modifying particles 310, and catalyst particles 320.

The electrolyte particles 300 may be composed of the same or similar to a material of the electrolyte layer 100-1 shown in FIG. 1a. That is, the electrolyte particles 300 may include a yttria-stabilized zirconia, a scandia and a yttria-stabilized zirconia, and may be a gadolinium (Gd) doped ceria ($CeO_2$), which is an oxygen ion conductor having a fluorite structure, or a stabilized bismuth oxide ($Bi_2O_3$). However, the material of the electrolyte particle 300 is merely illustrative, and may include any material used as an electrolyte necessary for forming a catalyst.

The modifying particles 310 include a transition metal oxide capable of chemical interaction with a metal of a perovskite based oxide through electron orbital hybridization. The material constituting the modifying particles 200 may be the same or similar to that of the modifying layer 110-2 of in FIG. 1b. Therefore, the transition metal oxide of the modifying particles 310 may be an oxygen ion non-conductive material.

The catalyst particles 320 include a perovskite based oxide as an electrochemical oxygen reduction catalyst. The material constituting the catalyst particles 210 corresponds to a material which is same or similar to the material constituting the catalyst layer 120-1 or 120-2 disclosed in FIG. 1a or 1b, and thus a detailed description thereof will be omitted.

As described in FIG. 3, in one embodiment, the electrolyte particles 300 forms a core, and the modifying particles 310 and the catalyst particles 320 form a shell which is surrounding at least portion of a surface of the core corresponding to the electrolyte particles 300 in a core-shell secondary particle structure. The modifying particles 310 and the catalyst particles 320 are bonded to the surface of the electrolyte particles 300 constituting the core and a plurality of the modifying particles 310 and the catalyst particles 320 are bonded to each other to surround the electrolyte particles 300 to form the shell of the electrolyte particle 300 corresponding to the core. Then, the modifying particles 310 and the catalyst particles 320 may surround the entire surface of the electrolyte particle 300, or may cover only a portion of the surface of the electrolyte particle 300.

The electrochemical catalyst structure of the core-shell secondary particle structure shown in FIG. 3 is formed by mixing the electrolyte particles 300, the modifying particles 310, and the catalyst particles 320 and then sintering a mixture to form a powder-based porous structure. In the core-shell secondary particle structure, a core size of the electrolyte particle 300 may be from 100 nm to 300 nm, and a shell size of the modifying particle 310 and the catalyst particle 320 may be from 50 nm to 100 nm. A molar ratio of the modifying particles 310 in a total molar ratio of the modifying particles 310 and the catalyst particles 320 may be from 2 mol % to 15 mol %. However, the particle size of the electrolyte particles 300, the modifying particles 310, and the catalyst particles 320 and the molar ratio of the modifying particles 310 can be selectively adjusted.

Examples 1 and 2 of the electrochemical catalyst structure including the heterostructure oxide according to the present invention are as follows.

Example 1

Example 1 is an embodiment of a plate-shaped electrochemical catalyst structure composed of a catalyst layer, a modifying layer and an electrolyte layer. A lanthanum strontium manganese oxide ($La_{0.8}Sr_{0.2}MnO_3$, LSM) is used as the catalyst layer, a scandia-stabilized zirconia is used as the ion-conductive modifying layer, and a yttria-stabilized zirconia is used as the electrolyte layer to form an electrochemical catalyst structure. The oxygen reduction catalysis of the LSM catalyst without the modifying layer or the modifying particles is compared with the electrochemical catalyst structure according to the present invention.

Figure 4A:
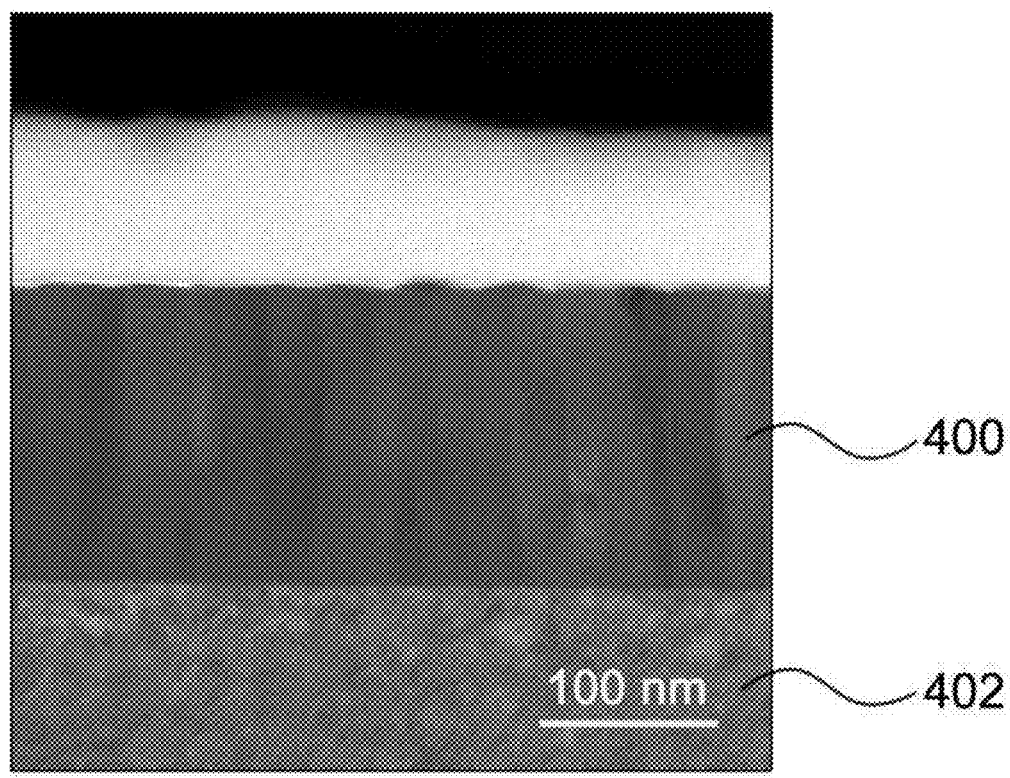
FIGS. 4a to 4f are reference drawing of one embodiment for comparison between electrochemical catalyst structures.
Figure 4B:
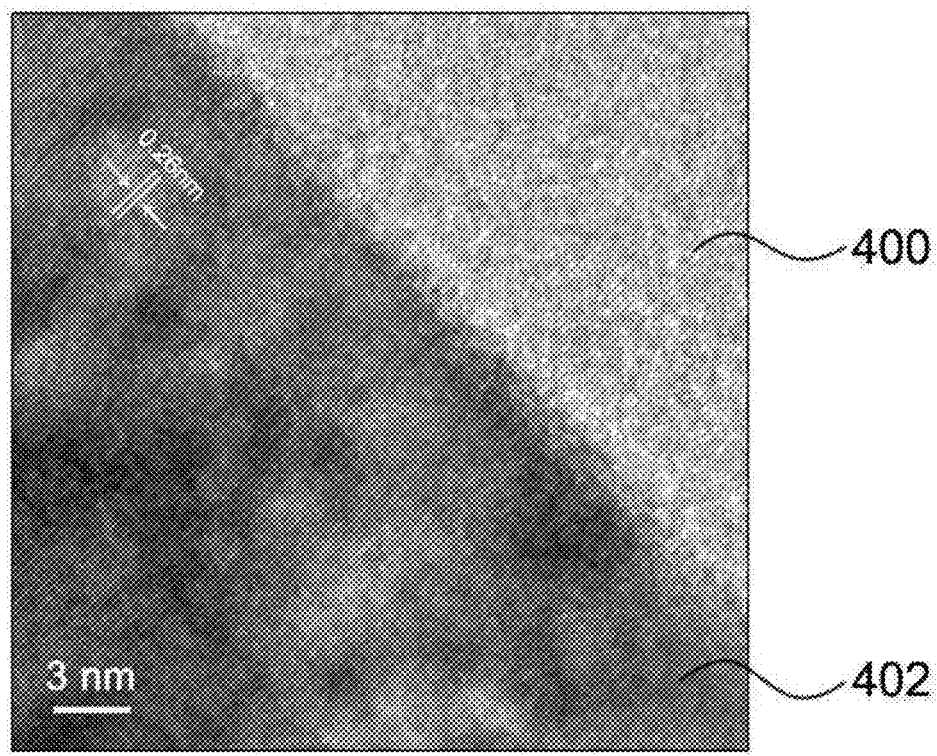
Figure 4C:
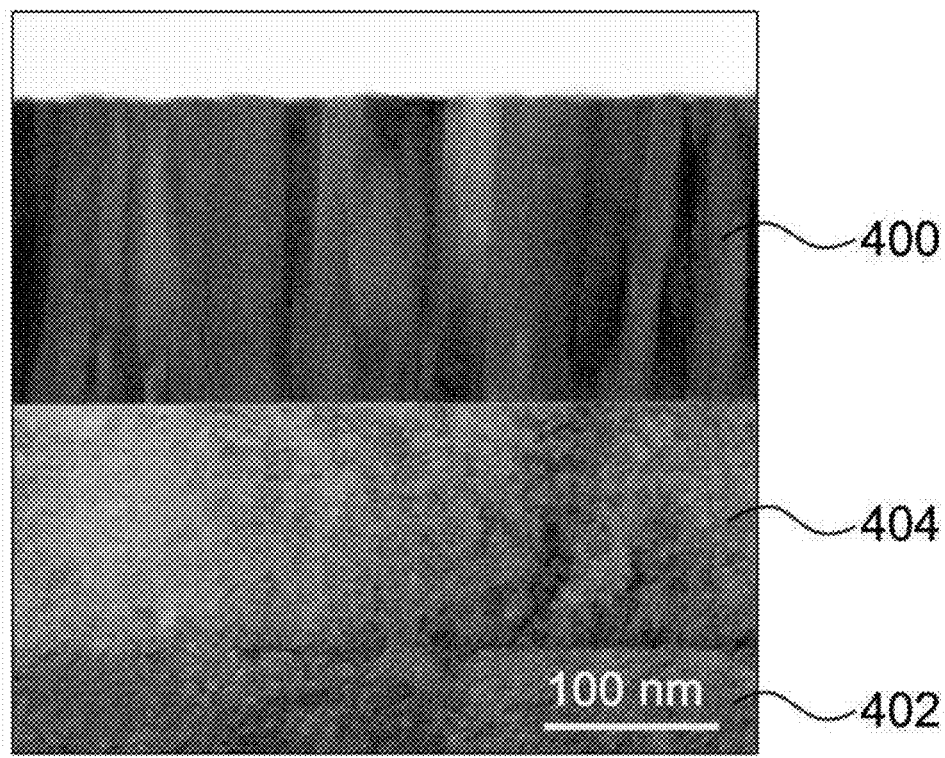
Figure 4D:
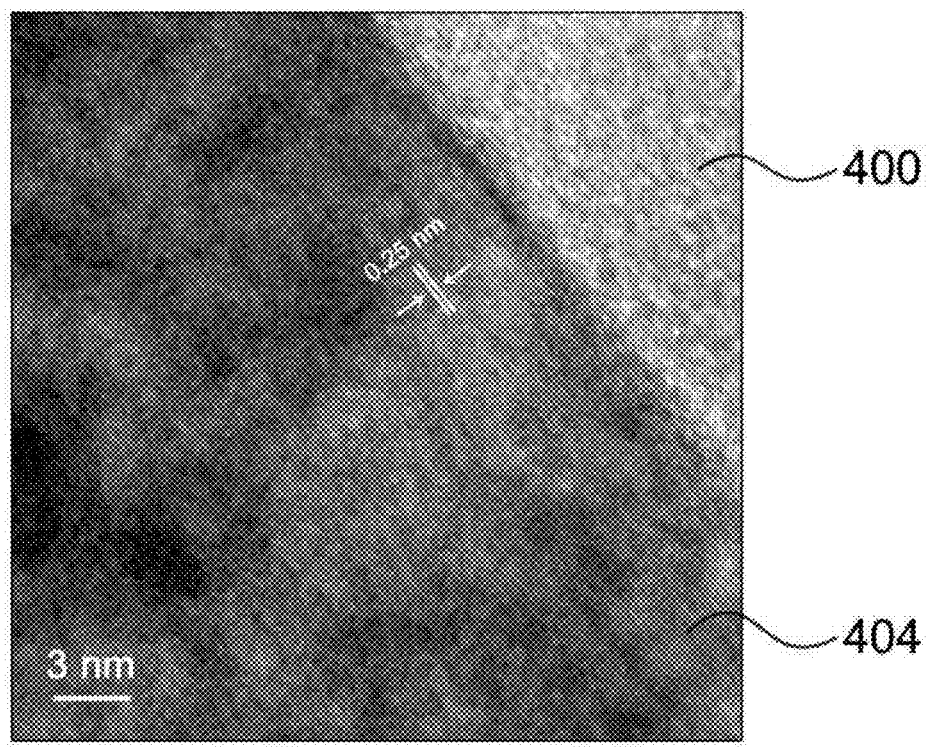
Figure 4E:
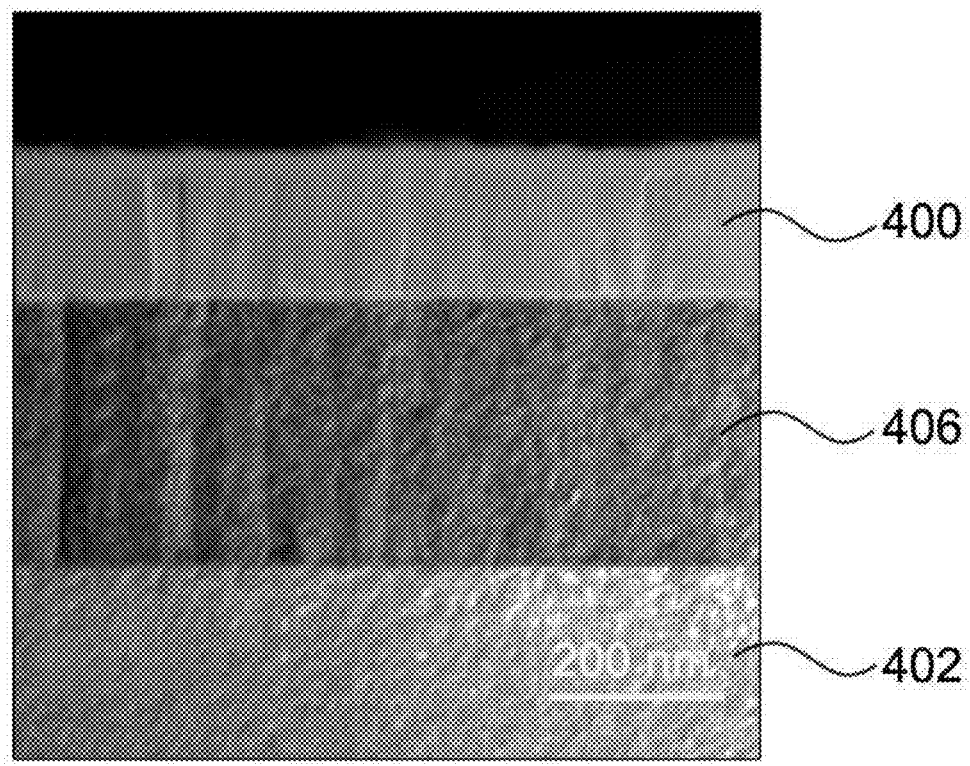
Figure 4F:
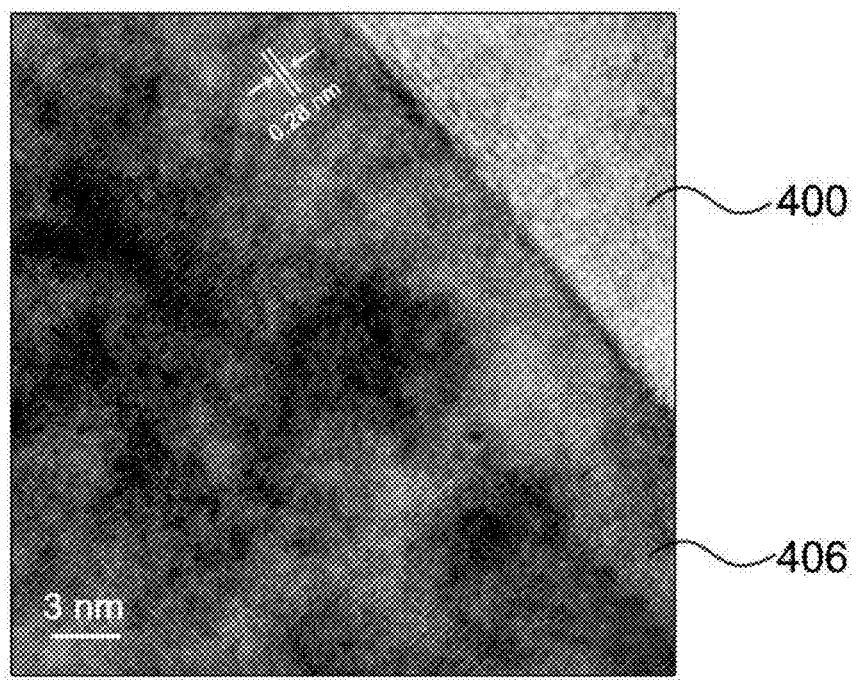

FIGS. 4a-4f are reference drawing for comparison between electrochemical catalyst structures. FIGS. 4a and 4b illustrate a catalyst structure in which there is no modifying layer and only a catalyst layer 400 and an electrolyte layer 402 are present. FIGS. 4c and 4d illustrate a catalyst structure according to the present invention in which a modifying layer 404 between the catalyst layer 400 and the electrolyte layer 402 are present, and FIGS. 4e and 4f illustrate a catalyst structure in which a samarium doped ceria between the catalyst layer 400 and the electrolyte layer 402 is present.

Referring to FIGS. 4a to 4f, a thickness of the catalyst layer 400 in an electrode structure is about 160 nm, and a thickness of the modifying layer 404 is about 120 nm. An electronic structure of the manganese (Mn) in the catalyst layer 400 is analyzed by XAS, to confirm an effectiveness of the ion-conductive modifying layer 404 for an orbital hybridization. In principal, B site transition metal in a perovskite based oxide as a catalyst is octahedrally bonded to six oxygen ions. The B site metal is capable of varying its valence reversibly, exchanging the bonded oxygen ions with gaseous ones. Therefore, the binding property of Mn—O is directly correlated to the catalytic oxygen reduction, in the case of the catalyst layer 400, which can be studied by the valence electron structure of Mn, d-band as Mn 3d binds with O 2p making Mn—O bonds. A pre-edge structure in Mn K-edge XAS manifests the property of the 3d orbital of manganese (Mn), which is the valence electron of Mn, thus, the binding property of Mn—O can be analyzed.

Figure 5:
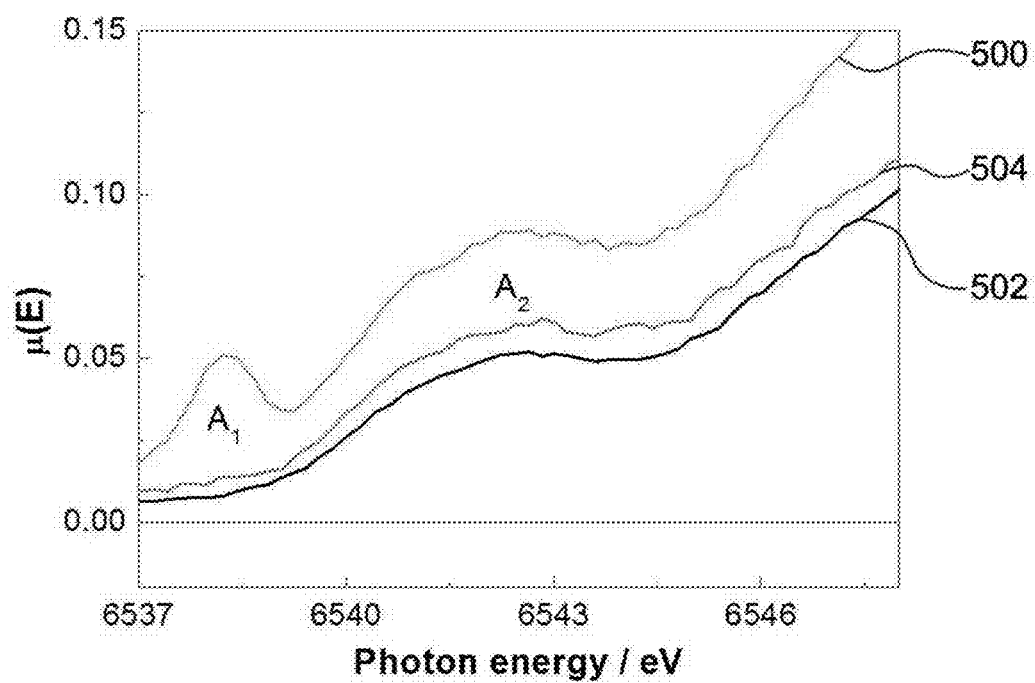
FIG. 5 illustrates an analytical graph for the manganese (K) pre-edge structure of each of the electrochemical catalyst structures shown in FIGS. 4a to 4f.

FIG. 5 illustrates the Mn K pre-edge structures of the electrochemical catalyst structures shown in FIG. 4. As shown in FIG. 5, the XAS spectrum 500 of the catalyst layer formed on the modifying layer is different from the other spectra 502 and 504, formed on the electrolyte layer and the samarium doped ceria, respectively.

Figure 6:
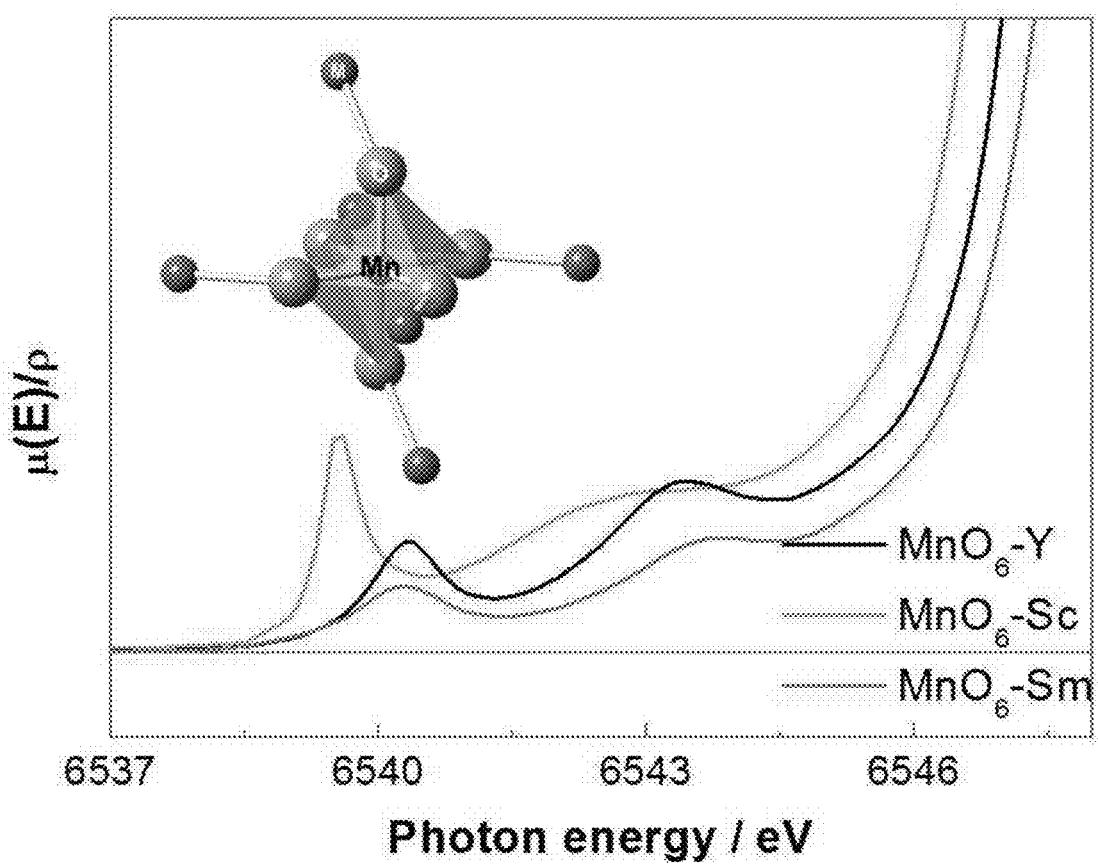
FIG. 6 is a graph illustrating ab initio calculation corresponding to an analysis graph of the manganese (Mn) K pre-edge structure shown in FIG. 5

FIG. 6 is a graph illustrating ab initio calculation corresponding to a theoretical prediction of the Mn pre-edge structures (shown in FIG. 5) as a function of adjacent metal ions. Referring to FIG. 6, the sub-peak near 6538 eV is attributed to an orbital hybridization between scandium (Sc) 3d orbitals of a modifying layer adjacent to a valence electron orbital of manganese (Mn).

Figure 7:
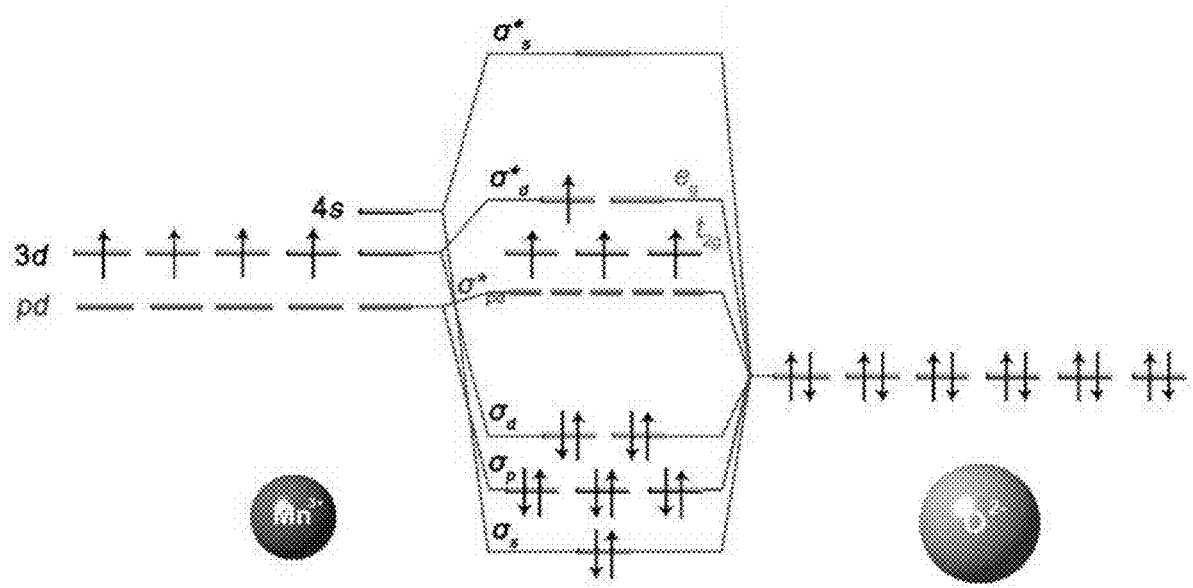
FIG. 7 is a schematic diagram showing the change in Mn—O binding structure of the electrochemical catalyst structure according to an embodiment.

FIG. 7 is a schematic diagram showing a change of Mn—O binding structure of the electrochemical catalyst structure according to the present invention. Referring to FIG. 7, the valence electron orbital of manganese (Mn 3d) forms σ*-antibonding, when octahedral binding is formed with oxygen ions. If an additional σ*-antibonding is formed due to the orbital hybridization with scandium (Sc) 3d orbital, the binding strength of the Mn—O become weak, and thus an oxygen exchange kinetics can be improved.

Figure 8:
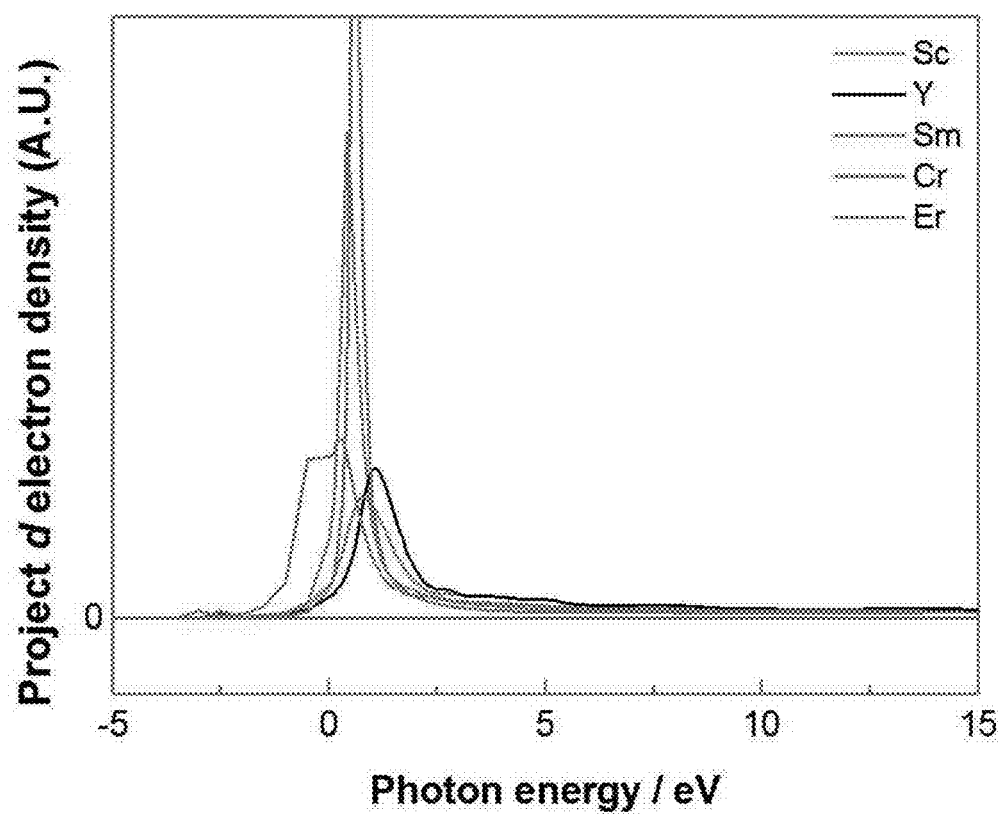
FIG. 8 is a graph illustrating ab initio calculation of a fourth-period transition metal element of an electrochemical catalyst structure according to an embodiment.

FIG. 8 is a graph illustrating ab initio calculation of a fourth-period transition metal element of an electrochemical catalyst structure to predict rationally the effective transition metal ions for the orbital hybridization according to the present invention. Referring to FIG. 8, it is expected that chromium (Cr) can act as a modifying layer by causing a strong orbital hybridization with manganese (Mn). Through such a method, a material of the modifying layer suitable for an oxide catalyst containing manganese (Mn) or cobalt (Co) can be derived. On the other hand, the combinations of the catalyst layer (LSM) and the electrolyte layer or the samarium doped ceria does not induce the orbital hybridization, by which it is predicted that there is no improvement in the oxygen exchange kinetics of the catalyst layer.

Figure 9:
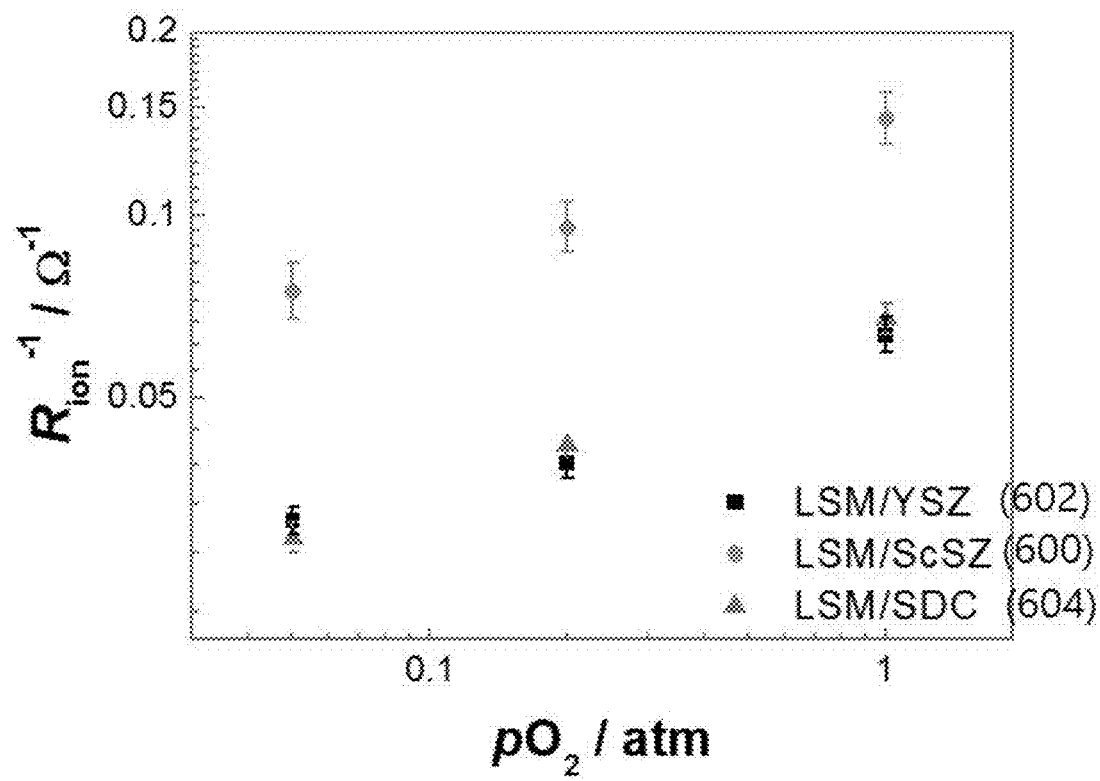
FIG. 9 is a graph illustrating an oxygen exchange capacity with and without a modifying layer of each of the electrochemical catalyst structures.

FIG. 9 is a graph illustrating an oxygen exchange capacity with and without the modifying layer of each of the electrochemical catalyst structures. A catalytic performance of oxygen reduction is compared in the electrochemical catalyst structures with and without modifying layers, by analyzing via an electrochemical impedance spectroscopy. Referring to FIG. 9, it is observed that the oxygen exchange capacity is improved by up to 240%, in the case of the catalyst layer 600 deposited on the modifying layer at a measurement temperature of 700° C. to 800° C., as compared with the catalyst layer 602 deposited on the electrolyte layer or the catalyst layer 604 deposited on the samarium-doped ceria, and thus it can be confirmed that modifying the catalytic performances according to the chemical interaction in the heterostructure is possible.

Example 2

Example 2 is an embodiment of an electrochemical catalyst structure of a core-shell secondary particle structure composed of catalyst particles, modifying particles and/or electrolyte particles. A lanthanum strontium manganese oxide is used as catalyst particles, a scandia stabilized zirconia is used as modifying particles, and a yttria-stabilized zirconia is used as electrolyte particles to form an electrochemical catalyst structure.

Figure 10A:
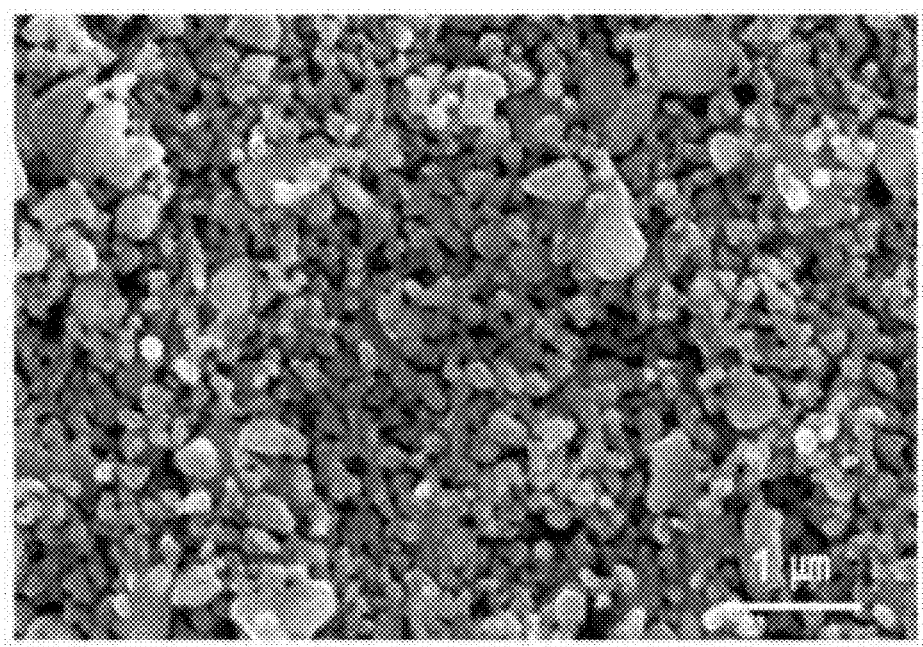
FIGS. 10a to 10c are reference drawing of another embodiment for comparison between electrochemical catalyst structures.
Figure 10B:
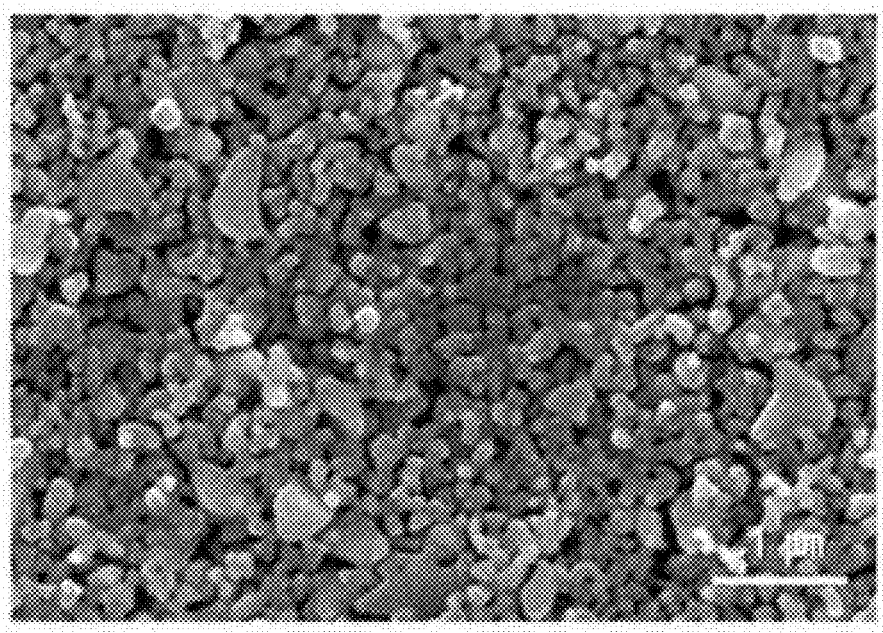
Figure 10C:
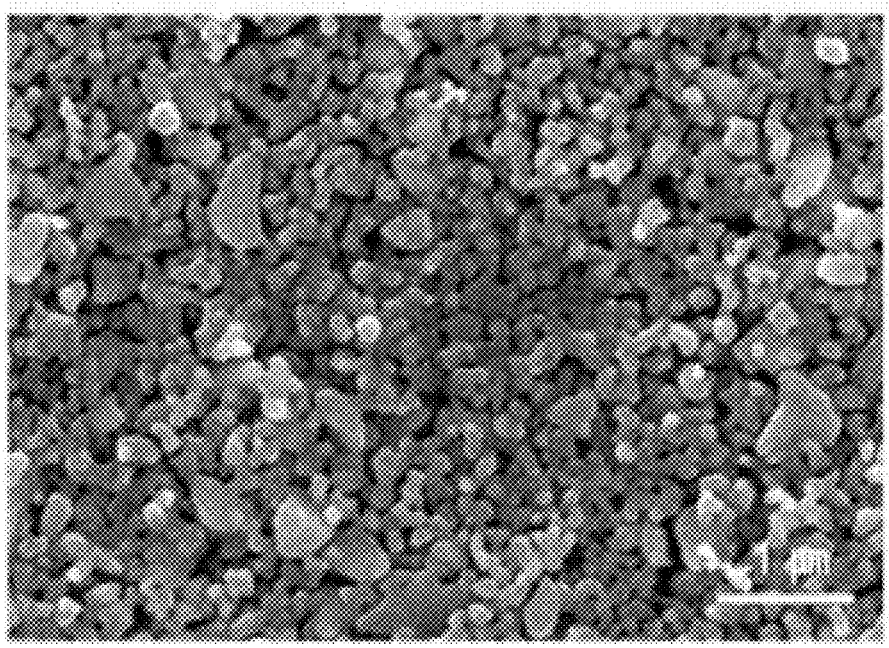

FIGS. 10a to 10c are reference drawings of another embodiment for comparison between electrochemical catalyst structures, FIG. 10a illustrates a catalyst structure composed of catalyst particles and electrolyte particles of yttria-stabilized zirconia, and FIG. 10b illustrates a catalyst structure composed of catalyst particles and ion-conductive modifying particles of scandia-stabilized zirconia, and FIG. 10c illustrates a catalyst structure composed of catalyst particles and more-conductive electrolyte particles of samarium doped ceria. Referring to FIGS. 10a to 10c, a porous structure is formed by using a lanthanum strontium manganese oxide as oxide catalyst particles and a scandia stabilized zirconia as ion conductive modifying particles. Then, about 44.5 vol % of the modifying particles can be added. A porous powder of catalyst particle-electrolyte particle or catalyst particle-samarium-doped ceria particle as a control group can be fabricated by the same method to evaluate a catalytic performance of oxygen reduction and a performance of solid oxide fuel cell.

Figure 11:
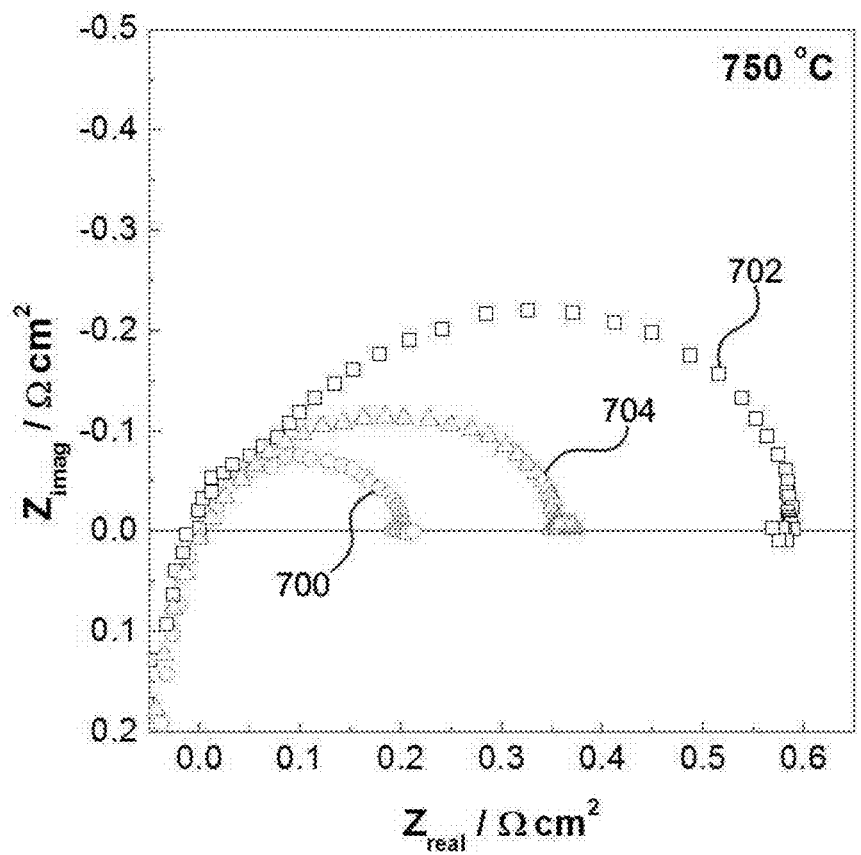
FIG. 11 is a graph illustrating impedance spectroscopy analysis of an electrochemical catalyst structure according to an embodiment.

FIG. 11 is a graph illustrating impedance spectroscopy analysis of an electrochemical catalyst structure according to the present invention. Referring to FIG. 11, as analyzed result of the catalytic performance for oxygen reduction by using an electrochemical impedance spectroscope of a cathode half-cell in a measured temperature of 750° C., in the case of catalyst structure 700 composed of catalyst particles and modifying particles, the smallest polarization resistance of 0.203 Ω·cm² was shown. On the contrary, in the case of the catalyst structure 702 composed of the catalyst particles and the electrolyte particles, a polarization resistance of 0.590 Ω·cm$^2$ was shown, and in the case of the catalyst structure 704 composed of the catalyst particles and the samarium-doped ceria particles, a polarization resistance of 0.358 Ω·cm$^2$ was shown. Therefore, the catalyst structure composed of the catalyst particles and the modifying particles will have a better catalytic performance of oxygen reduction as compared with the catalyst structure composed of the catalyst particles and the electrolyte particles with even higher ionic conductivity.

Figure 12:
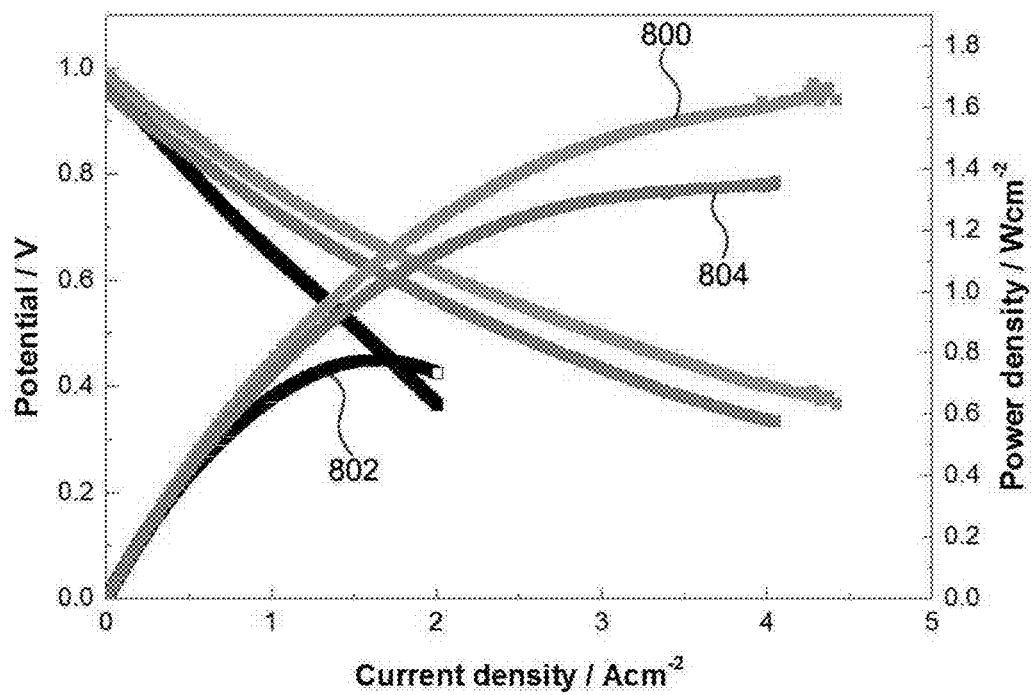
FIG. 12 is a graph illustrating the performance of a solid oxide fuel cell to which the electrochemical catalyst structure applies according to an embodiment.

FIG. 12 is a graph illustrating the performance of a solid oxide fuel cell to which the electrochemical catalyst structure is applied according to the present invention. Referring to FIG. 12, an applicability to an actual electrochemical energy system can be tested, by fabricating a solid oxide fuel cell and evaluating a performance according to an oxygen reduction electrode. After fabricating the same Ni-electrolyte|an anode-electrolyte supporter having an electrolyte structure, as a result of applying the catalyst particles containing a modifying particles to a fuel cell 800, the unit output density of 1.68 W·cm$^{-2}$ is shown at a temperature of 750° C. as shown in FIG. 12. In contrast, in the fuel cell 802 to which the catalyst particles and the electrolyte particles are applied, the unit output density of 0.78 W·cm$^{-2}$ is shown, and in the fuel cell 804 to which the catalyst particles and the samarium-doped ceria particles are applied, the unit output density of 1.36 W·cm$^{-2}$ is shown. Therefore, it can be confirmed that the fuel cell to which the catalyst particles and the modifying particles are applied shows excellent performance as compared with the fuel cell or the catalyst particle to which the catalyst particle and the electrolyte particle is applied. Through this, it can be confirmed that the modifying of the oxygen reduction catalyst through the chemical interaction of the heterostructure can be applied to the powder-based porous electrode, and the efficiency of the electrochemical energy conversion device can be greatly improved.

Example 3

Example 3 is an embodiment of an electrochemical catalyst structure with an ion non-conductive modifying layer and a porous oxygen scaffold deposited on an electrolyte layer by an infiltration technique using a metal precursor solution. A lanthanum strontium manganese oxide is used as catalyst particles, a scandium oxide ($Sc_2O_3$) is used as an ion non-conductive modifying layer, and a yttria-stabilized zirconia is used as a porous scaffold and electrolyte layer to form an electrochemical catalyst structure.

The porous oxide scaffold is employed to provide an oxygen-ion conduction pathway throughout the structure by a screen-printing method using yttria-stabilized zirconia particles on a yttria-stabilized zirconia electrolyte layer. Subsequently, a metal precursor solution of dissolved scandium nitrate in ethanol is infiltrated onto the porous scaffold to form a scandium oxide modifying layer. The precursor solution is dropped on the porous scaffold and sintered at 950° C. in air. Finally, a precursor solution of La, Sr and Mn dissolved in ethanol and distilled water (1:2 v/v) is dropped on the porous scaffold coated with the modifying layer and sintered at 900° C. in air to form the catalyst layer of lanthanum strontium manganese oxide. To ensure the stoichiometry of the catalyst layer, a citric acid is utilized as a complexing agent for the precursor solution. The solvent composition of ethanol and distilled water can be tweaked considering the wettability and solubility of the solution. To confirm the influence of the modifying on catalytic activity of the system, a catalyst structure without modifying layer is fabricated in the same manner except the infiltration of modifying layer.

Figure 13:
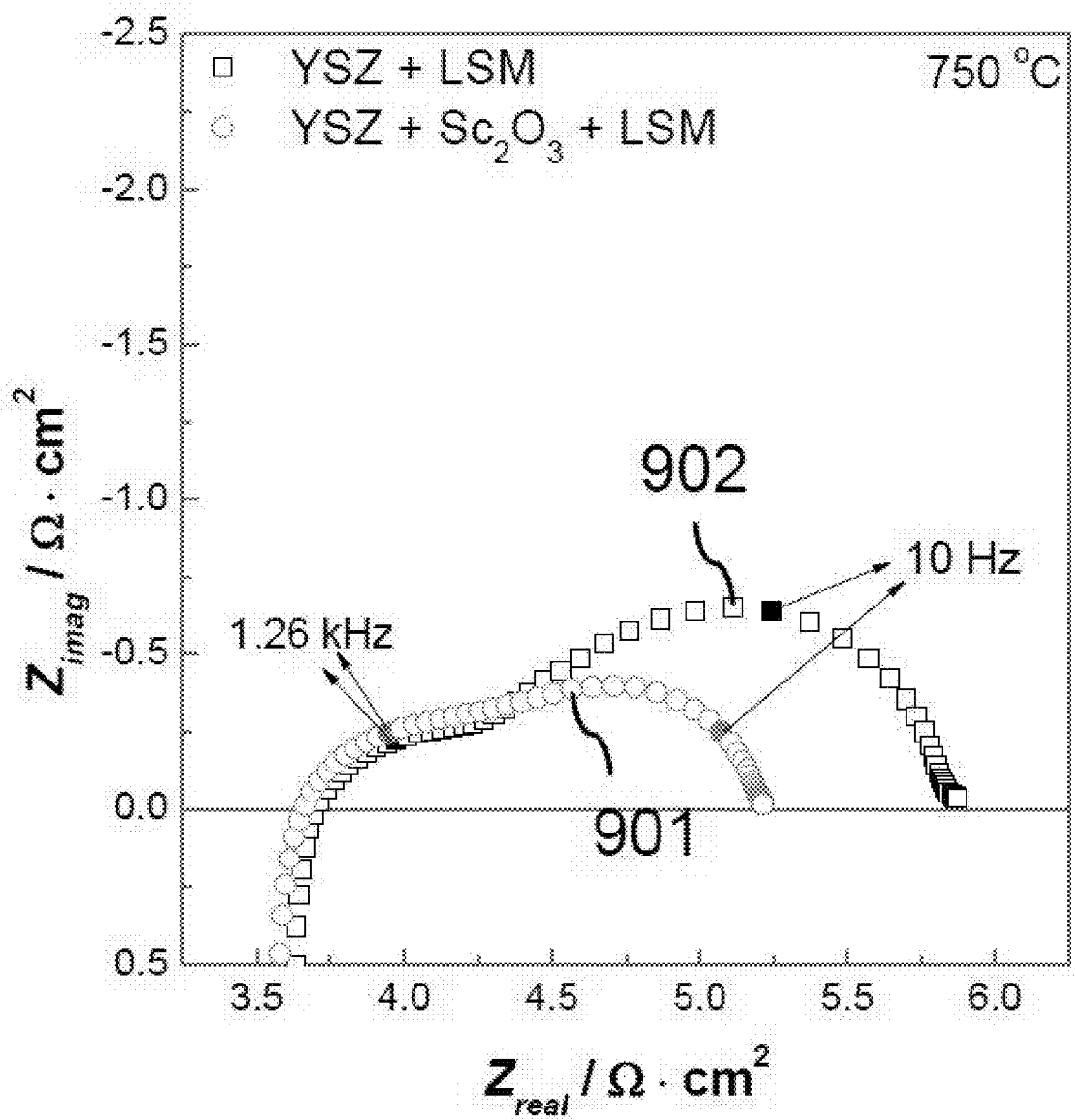
FIG. 13 is a graph illustrating an impedance spectra of the catalyst structures with and without the modifying layer.

FIG. 13 is a graph illustrating an impedance spectra of the catalyst structures with and without the modifying layer measured at 750° C. in air. The spectrum of the catalyst structure with the modifying layer 901 shows the smaller polarization resistance than the catalyst structure without the modifying layer 902. The spectra consist of two semicircles as depicted in FIG. 13, one at high frequency (front part in the spectra) represents the polarization resistance of the porous scaffold, the other at low frequency (rear part in the spectra) reveals the polarization resistance of the catalyst layer. The former is nearly identical as expected because the same scaffolds are employed to two structures, while the polarization from the catalyst layer with the modifying layer is half as much as the catalyst layer without the modifying layer. This observation confirms that the modifying layer need not be ion-conductive and the modifying layer with a specific element capable of the orbital hybridization can be easily adopted into the catalyst system using a porous scaffold and solution based processing.

Figure 14:
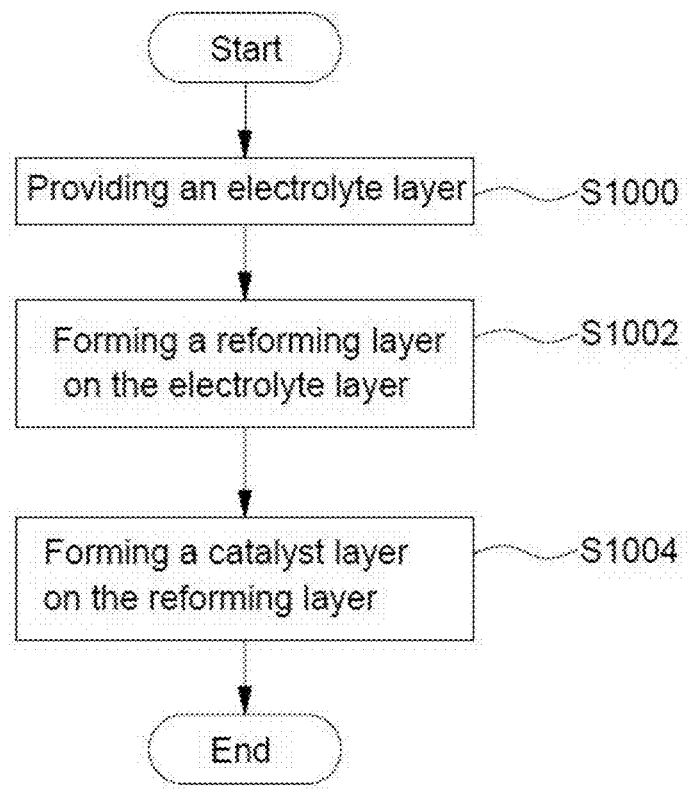
FIG. 14 is a flow chart of one embodiment for explaining a method of fabricating an electrochemical catalyst structure according to an embodiment.

FIG. 14 is a flowchart of an embodiment of a method for fabricating an electrochemical catalyst structure according to the present invention.

Referring to FIG. 14, an electrolyte layer is provided to form a plate-structured electrochemical catalyst structure in an operation step S1000. The electrolyte layer can be formed by a material consisting of a yttria-stabilized zirconia, a scandia and yttria-stabilized zirconia, doped ceria or a stabilized bismuth oxide.

After an operation step S1000, a modifying layer comprising a transition metal oxide capable of chemical interaction with a metal of a perovskite based oxide through the orbital hybridization is formed on the electrolyte layer in in an operation step S1002. The transition metal oxide may include an oxide of a scandium (Sc), a titanium (Ti), a vanadium (V), a chromium (Cr), a manganese (Mn), an iron (Fe), a cobalt (Co), a nickel (Ni), a copper (Cu), or a zinc (Zn).

The modifying layer may be formed on the electrolyte layer by a vapor deposition method such as physical vapor deposition (PVD) including spray pyrolysis deposition (SPD), chemical vapor deposition (CVD), atomic layer vapor deposition (ALD), sputtering and thermal evaporation. A spray pyrolysis deposition may be accomplished by an ultrasonic atomization, a spray atomization, or a vaporization. The chemical vapor deposition (CVD) method includes a plasma CVD, a polycrystalline silicon CVD, or a thermal CVD, and the physical vapor deposition (PVD) method may include a vapor deposition or a sputter deposition. This is illustrative, and the present invention is not limited thereto. For example, the modifying layer may be coated on the electrolyte layer through a wet coating method such as a spraying method, a sol-gel method, a coating method by using a slurry, an inkjet method, or a soaking method, using a dispersion solution in which the transition metal oxide particles are dispersed in a suitable solvent.

After an operation step S1002, a catalyst layer containing the perovskite based oxide as an electrochemical oxygen reduction catalyst is formed on a second main surface opposite to a first major surface of the modifying layer in contact with the electrolyte layer in an operation step S1004. The perovskite based oxide may include a lanthanum manganese oxide ($LaMnO_3$), a lanthanum cobalt iron oxide ($LaCo_{1-x}Fe_xO_3$), a barium cobalt iron oxide ($BaCo_{1-x}Fe_xO_3$), or a strontium cobalt oxide ($SrCoO_3$) and so on. Also, the perovskite based oxide may include a doped lanthanum manganese oxide, a doped lanthanum cobalt-iron oxide, a doped barium cobalt-iron oxide, or a doped strontium cobalt oxide, and the like. Similar to the modifying layer, the catalyst layer may be formed on the modifying layer by a vapor deposition method such as a spray pyrolysis deposition (SPD), a chemical vapor deposition (CVD), an atomic layer vapor deposition (ALD), or a physical vapor deposition. Also, the catalyst layer may be coated on the modifying layer through a wet coating method such as a spraying method, a sol-gel method, a coating method using a slurry, an inkjet method, or a soaking method, using a dispersion solution in which perovskite based metal oxide particles are dispersed in a suitable solvent.

Figure 15:
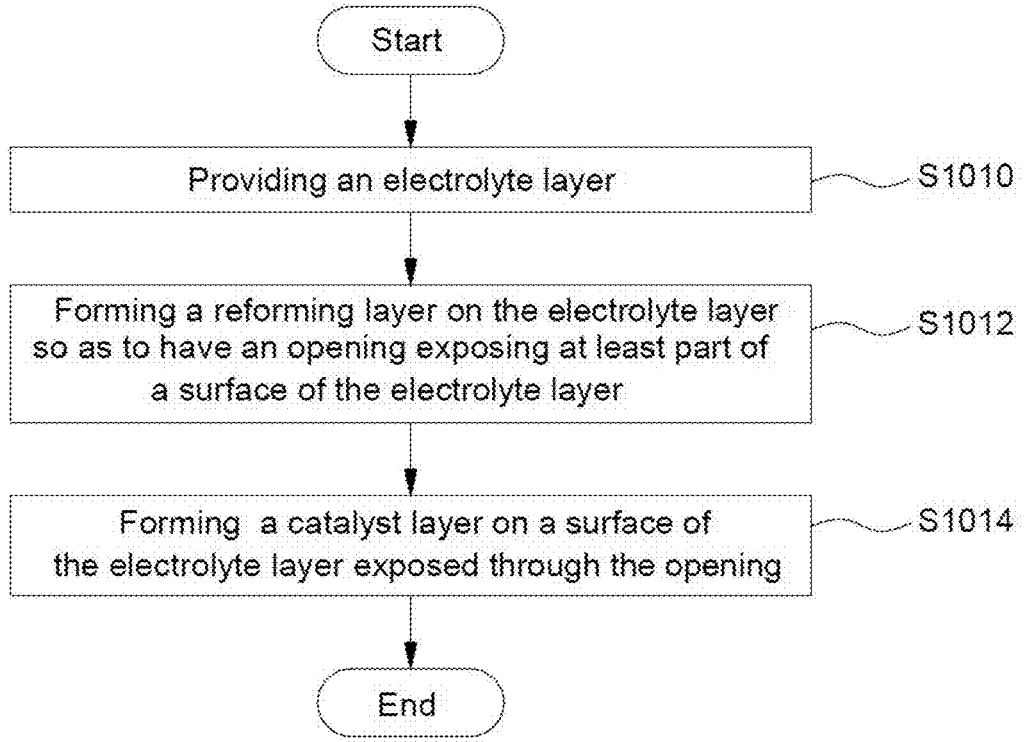
FIG. 15 is a flow chart of another embodiment for explaining a method of fabricating an electrochemical catalyst structure according to an embodiment.

FIG. 15 is a flow chart of another embodiment for describing a method of fabricating an electrochemical catalyst structure according to the present invention.

Referring to FIG. 15, an electrolyte layer is provided to form a plate-shaped electrochemical catalyst structure in an operation step S1010. The electrolyte layer is the same as or similar to the electrolyte layer of the above-mentioned step S1000, and thus a detailed description thereof will be omitted.

After an operation step S1010, a modifying layer having a transition metal oxide capable of chemical interaction with a metal of a perovskite based oxide through the orbital hybridization is formed on the electrolyte layer so as to have an opening exposing at least portion of a surface of the electrolyte layer in an operation step S1012. When the transition metal oxide of the modifying layer is an oxygen ion non-conductive material, the modifying layer may be formed on the electrolyte layer so as to have an opening exposing at least portion of a surface of the electrolyte layer. The modifying layer may be formed in a plurality of island shapes on the electrolyte layer in order to form an opening exposing at least portion of the surface of the electrolyte layer and may be patterned so that at least one opening is formed in a state in which the modifying layer is entirely coated on the electrolyte layer. However, the pattern shape in which the modifying layer forms at least one or more openings on the electrolyte layer is not limited thereto.

After an operation step S1012, a catalyst layer containing a perovskite based oxide as an electrochemical oxygen reduction catalyst is formed on a surface of the electrolyte layer exposed through the opening in an operation step S1014. The catalyst layer may be formed on the surface of the electrolyte layer exposed through the opening. Oxygen ions in the catalyst layer cannot pass through the modifying layer because the transition metal oxide of the modifying layer corresponds to an oxygen ion non-conductive material. However, since the catalyst layer is formed on the surface of the electrolyte layer exposed through the opening, oxygen ions of the catalyst layer can be conducted directly to the electrolyte layer.

FIG. 15 is a flow chart of still another embodiment for describing a method of fabricating an electrochemical catalyst structure according to the present invention.

Figure 16:
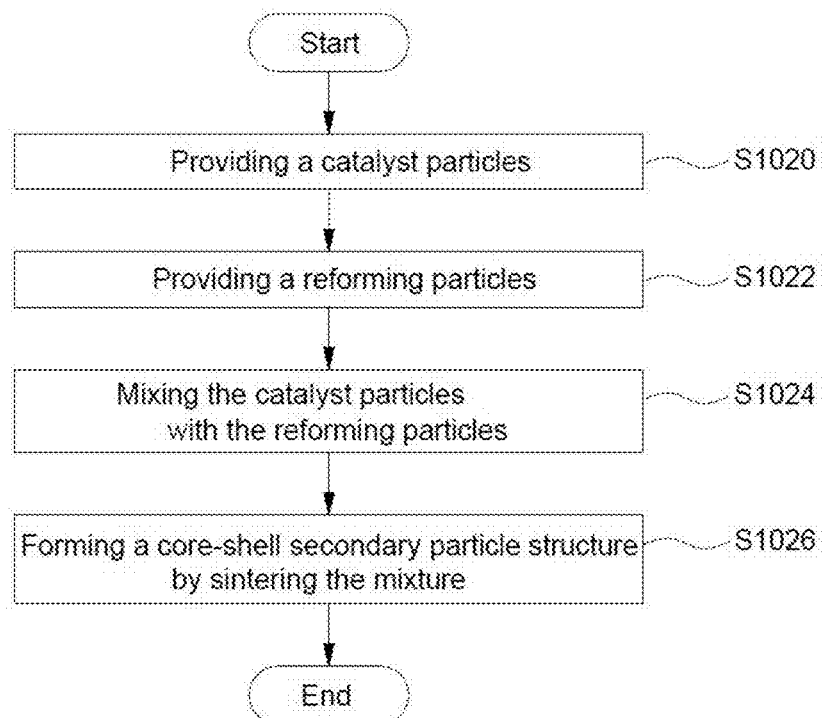
FIG. 16 is a flow chart of still another embodiment for explaining a method of fabricating an electrochemical catalyst structure according to an embodiment.

Referring to FIG. 16, a catalyst particles containing a perovskite based oxide as an electrochemical oxygen reduction catalyst are provided in an operation step S1020. The perovskite based oxide corresponding to the catalyst particles are the same as those described above, and thus a detailed description thereof will be omitted.

After an operation step S1020, a modifying particle containing a transition metal oxide capable of chemical interaction with a metal of the perovskite based oxide through electron orbital hybridization is provided in an operation step S1022. Since the transition metal oxide constituting the modifying particles is as described above, a detailed description thereof will be omitted.

After an operation step S1022, the catalyst particles and the modifying particles are mixed in an operation S1024. After an operation step S1024, a mixture of the catalyst particles and the modifying particles is sintered to form a core-shell secondary particle structure in which the modifying particles forms a core and the catalyst particles forms a shell which is surrounding at least portion of a surface of the core in an operation step S1026. The core-shell secondary particle structure can be formed by doing a crushing or classification treatment of the mixture of sintered catalyst particles and modifying particles. The catalyst particles are bonded to a surface of the modifying particles constituting the core and surround a surface of the modifying particle by the plurality of catalyst particles are bonded to one modifying particle, in order to form a shell of the modifying particle corresponding to the core. At this time, the catalyst particles may surround the entire surface of the modifying particles, or may cover only some of the surfaces.

Figure 17:
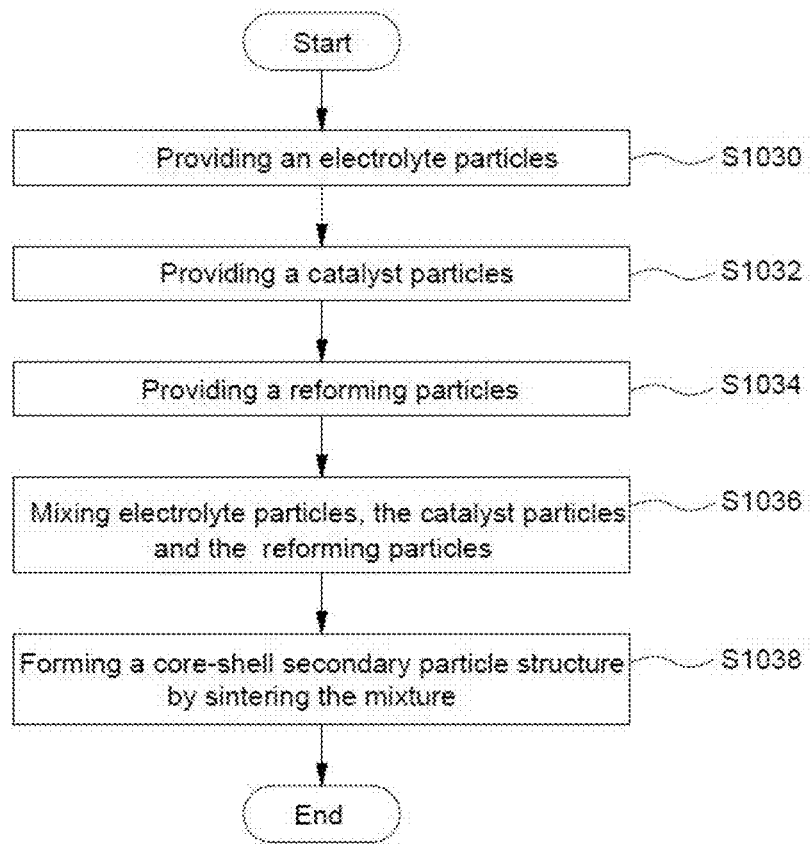
FIG. 17 is a flow chart of still another embodiment for explaining a method of fabricating an electrochemical catalyst structure according to an embodiment.

FIG. 17 is a flow chart of still another embodiment for describing a method of fabricating an electrochemical catalyst structure according to the present invention.

Referring to FIG. 17, electrolyte particles are provided to form a core-shell secondary particle structure in an operation step S1030. The electrolyte particles may include a yttria-stabilized zirconia, a scandia and a yttria-stabilized zirconia, and may also include a gadolinium (Gd)-doped ceria (CeO2) or a stabilized bismuth oxide (Bi2O3).

After an operation step S1030, catalytic particles containing a perovskite based oxide as an electrochemical oxygen reduction catalyst are provided in an operation step S1032. Since the step 1032 of providing the catalyst particles is the same as or similar to an above-mentioned step S1020, detailed description is omitted.

After an operation step S1032, modifying particles containing a transition metal oxide capable of chemical interaction with a metal of the perovskite-based oxide through the orbital hybridization are provided in an operation step S1034. The 1032 step of providing the modifying particles is the same as or similar to an above-mentioned step S1022, so a detailed description is omitted.

After an operation step S1034, the electrolyte particles, the catalyst particles, and the modifying particles are mixed in an operation step S1036. After an operation step S1036, a mixture of the electrolyte particles, the catalyst particles and the modifying particles are sintered to form a core-shell secondary particle structure in which the electrolyte particles form a core and the catalyst particles and the modifying particles form a shell which is surrounding at least portion of a surface of the core in an operation step S1038. In some embodiments, a mixture of sintered electrolyte particles, catalyst particles and modifying particles may be further done a crushing or classification treatment to form the core-shell secondary particle structure having a uniform size. The shell of the electrolyte particle corresponding to the core is formed as the modifying particles and the catalyst particles are bonded to a surface of the electrolyte particles forming the core and a plurality of the modifying particles and the catalyst particles are bonded to each other to surround the electrolyte particles. Then, the modifying particles and the catalyst particles may surround the entire surface of the electrolyte particle, or may cover only a part of the surface of the electrolyte particle.

According to the present invention, an electrochemical catalyst structure capable of improving the catalytic performance of a perovskite based oxide can be provided, as a modifying material comprising a transition metal oxide that can chemically interact with a metal of the perovskite based oxide through electron orbital hybridization are bonded to an oxygen reduction catalyst material, together with the perovskite based oxide which is the oxygen reduction catalyst. Also, at the same time, since a lattice structure of the perovskite based oxide is not changed or the binding property of constituent metal elements are not changed, the electrochemical catalyst structure capable of securing high stability of the perovskite based oxide can be provided.

Further, according to the embodiment of the present invention, a method of fabricating an electrochemical catalyst structure having the above-stated advantages can be provided.

In the above-mentioned embodiments, the electrochemical catalyst structure according to the embodiment of the present invention has a structure in which a catalyst layer and a modifying layer are in contact with each other to form a plane-contact interface, and catalyst particles and modifying particles are in contact with each other to form a point-contact interface. However, the present invention is not limited thereto. For example, within the scope of the present invention, the electrochemical catalyst structure may be modifying so as that at least one of the catalyst layer and the modifying layer is a linear structure and the other surrounds the linear structure, thereby forming a contact interface capable of chemical interaction through the orbital hybridization between at least one of the catalyst layer and the modifying layer having a linear structure and the other surrounding the linear structure.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An electrochemical catalyst structure disposed on an electrolyte comprising:
    a catalyst layer including a perovskite based oxide as an electrochemical oxygen reduction catalyst; and
    a modifier being in contact with the catalyst layer and including a transition metal oxide capable of chemical interaction with a metal of the perovskite based oxide through an electron orbital hybridization,
    wherein the transition metal oxide is an oxygen ion non-conductive material, and
    wherein the modifier is formed on the electrolyte so as to have an opening exposing at least a portion of a surface of the electrolyte, or to have a plurality of island shapes to expose the at least the portion of the surface of the electrolyte,
    wherein at least a portion of the catalyst layer is formed on the at least the portion of the surface of the electrolyte that is exposed through the opening or between the plurality of island shapes of the modifying layer.

2. The electrochemical catalyst structure of claim 1, wherein the perovskite based oxide include a lanthanum manganese oxide ($LaMnO_3$), a lanthanum cobalt iron oxide ($LaCo_{1-x}Fe_xO_3$), a barium cobalt iron oxide ($BaCo_{1-x}Fe_xO_3$), a strontium cobalt oxide ($SrCoO_3$), and a doped oxide thereof.

3. The electrochemical catalyst structure of claim 2, wherein the transition metal oxide changes d-band structure which is a valence electron orbital of manganese (Mn) or cobalt (Co).

4. The electrochemical catalyst structure of claim 1, wherein the transition metal oxide chemically interacts with B site transition metal of the perovskite based oxide through the electron orbital hybridization.

5. The electrochemical catalyst structure of claim 1, wherein the transition metal oxide includes at least one oxide of a scandium (Sc), a titanium (Ti), a vanadium (V), a chromium (Cr), a manganese (Mn), an iron (Fe), a cobalt (Co), a nickel (Ni), a copper (Cu) and a zinc (Zn).

6. The electrochemical catalyst structure of claim 1, wherein when the transition metal oxide is an oxygen ion conductive material, the modifying layer is disposed between the catalyst layer and an electrolyte layer, and the electrochemical catalyst structure includes a layer structure having the catalyst layer, the electrolyte layer, and the modifying layer between the catalyst layer and the electrolyte layer.

7. The electrochemical catalyst structure of claim 1, wherein the transition metal oxide is an oxygen ion non-conductive material, a porous scaffold made of an ion-conducting oxide is employed, on which the modifying layer and catalyst layer is deposited or coated.

* * * * *